United States Patent [19]

Jan de Vries

[11] Patent Number: 5,116,145
[45] Date of Patent: May 26, 1992

[54] ROLLER BEARING CONTAINING A LUBRICATION PUMP

[75] Inventor: Alexander Jan de Vries, Tiel, Netherlands

[73] Assignee: SKF Industrial Trading and Developement Company B.V., Nieuwegien, Netherlands

[21] Appl. No.: 586,899

[22] Filed: Sep. 24, 1990

[30] Foreign Application Priority Data

Sep. 25, 1989 [NL] Netherlands ............... 8902384

[51] Int. Cl.⁵ .......................................... F16C 33/66
[52] U.S. Cl. ................................. 384/465; 384/471
[58] Field of Search ............... 384/462, 465, 466, 471, 384/472, 473; 184/6, 28, 26, 27 R

[56] References Cited

U.S. PATENT DOCUMENTS

| | | | |
|---|---|---|---|
| 2,012,579 | 8/1935 | Obayashi | 384/465 |
| 2,789,021 | 4/1957 | Pedersen | 384/472 X |
| 4,181,379 | 1/1980 | Letts | 384/465 |
| 4,241,959 | 12/1980 | Frister | 384/472 |
| 4,541,785 | 9/1985 | Höarler | 384/465 X |
| 4,942,944 | 7/1990 | Frey et al. | 384/465 X |

FOREIGN PATENT DOCUMENTS

| | | | |
|---|---|---|---|
| 232978 | 8/1987 | European Pat. Off. | 384/465 |
| 3434501 | 3/1986 | Fed. Rep. of Germany. | |
| 1300216 | 3/1987 | U.S.S.R. | 384/465 |

Primary Examiner—Thomas R. Hannon
Attorney, Agent, or Firm—Eugene E. Renz, Jr.

[57] ABSTRACT

Roller bearing for a shaft or similar, containing an inner race and outer race between which one or more rows of rollers are mounted and whereby lubricant can be applied between the rollers and races, characterized by the fact that the roller bearing (3) contains a pump (9) or part thereof with which the lubricant can be sucked from a tank and delivered.

1 Claim, 2 Drawing Sheets

ROLLER BEARING CONTAINING A LUBRICATION PUMP

FIELD OF THE INVENTION

The invention concerns a rolling bearing for a shaft or similar, containing an inner race and an outer race between which one or more rows of rollers are mounted and whereby lubricant can be applied between the rollers and the races.

BACKGROUND OF THE INVENTION

A similar rolling bearing is generally known in may forms of execution, e.g., as a ball bearing, a spherical roller bearing, a cylindrical roller bearing or a taper roller bearing, and may be executed as a one or multiple row bearing. These rolling bearings are used, among other things, in drive mechanisms and gear transmission systems, e.g., in gear boxes and differentials for motor vehicles. The bearings and gears of these drive and gear mechanisms are lubricated by means of oil level lubrication or oil splash lubrication. For this purpose, the lower part of the casing of the mechanism must contain an oil tank filled with a relatively large amount of lubricant because at least one of the gear wheels has to be partially immersed to achieve the splash lubrication. For example, the end gear box of a rear axle assembly for a heavy truck requires about twenty-five (25) liters of lubricant which has to be changed regularly. It is clear that this involves considerable maintenance costs and, in particular in vehicles for transportation, the extra weight of the tank and the oil constitutes a drawback. Finally, the lubrication action of similar oil level or oil splash systems does not provide an optimal guarantee that the oil will be delivered directly and especially in sufficient quantity to the bearings and the points of contact of the gears.

SUMMARY OF THE INVENTION

The objective of the invention is to create a rolling bearing in which the aforementioned disadvantages have been eliminated.

This purpose is reached according to the invention because the rolling bearing contains a pump or part of a pump with which the lubricant is sucked from a tank and delivered.

This provides a simple and efficient manner to carry the oil only to the points of lubrication which are important, and it improves the lubrication of the driving elements because the oil can be supplied under pressure to the areas in need of lubrication. In addition, a smaller amount of oil will suffice.

According to a further embodiment of the invention, a rotating part of the pump is mounted on the shaft or rotating inner race, and the pump casing is installed on or inside the outer race. This results in an efficient construction with a simple design.

According to the invention, the rotating lubrication pump contained in the rolling bearing may be of the impulse type and be executed, for example, as a centrifugal pump whose design is well known.

In addition, according to the invention, the rotating lubrication pump may also be of the displacement type and be executed as a rotating compartmentalized pump or as a rotating capsule or impeller pump with flexible or swinging displacement elements. German patent application No. 3,434,501 shows an example of a similar rotating displacement pump in the form of an eccentric impeller pump with swinging spring-loaded displacement elements attached to the rotor.

The choice of the type of lubrication pump depends on the desired pressure, level of increase and Q-H characteristic, as well as the number of revolutions of the shaft and the space available in the roller bearing.

In a rolling bearing equipped with two rows of rollers, e.g., a double row taper bearing, it is advantageous, according to the invention, to mount the rotating lubrication pump between the two rows of rollers.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
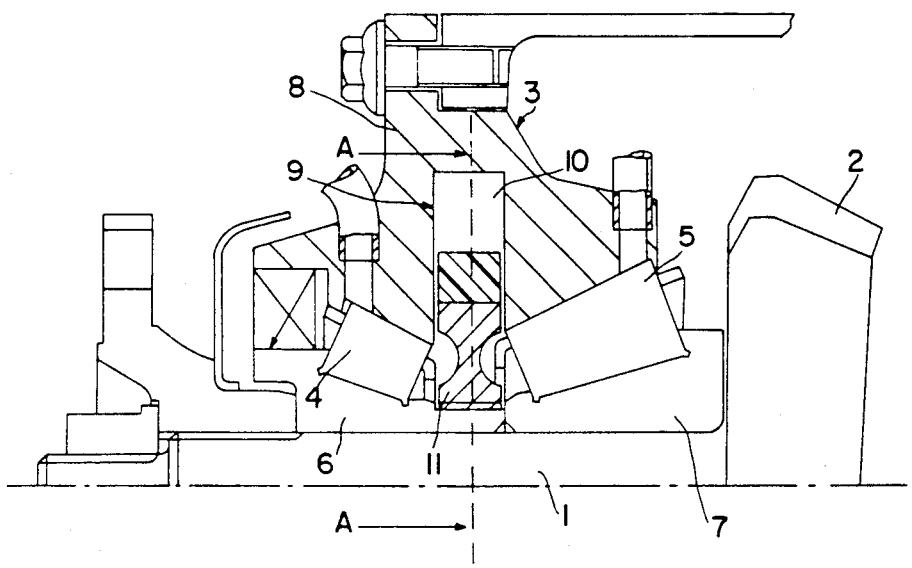
FIG. 1 shows a longitudinal section of a rolling bearing according to the invention mounted on a shaft.

FIG. 1 shows a shaft (1) to which a bevel gear wheel (2) has been attached. Together they form part of a drive mechanism not further shown. Shaft (1) is equipped with a double row taper bearing (3) consisting of two rows of tapered rollers (4, 5) mounted between two inner races (6) or (7) and a common outer race (8). A rotating lubrication pump (9) is contained in the bearing between the two rows of tapered rollers (4, 5) whereby the pump casing space (10) is eccentrically recessed in the axis A—A of outer race (8) in relation to the shaft 1.

Figure 2:
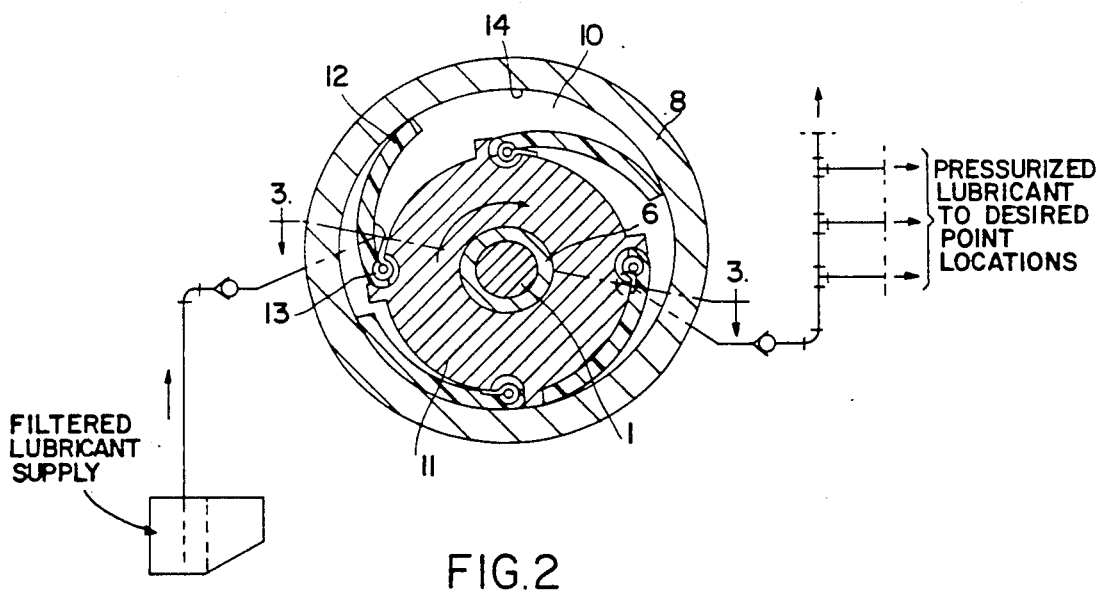
FIG. 2 shows a cross section of a rolling bearing taken on line A—A of the rotating lubrication pump on a smaller scale, contained in the roller bearing according to FIG. 1.
Figure 3:
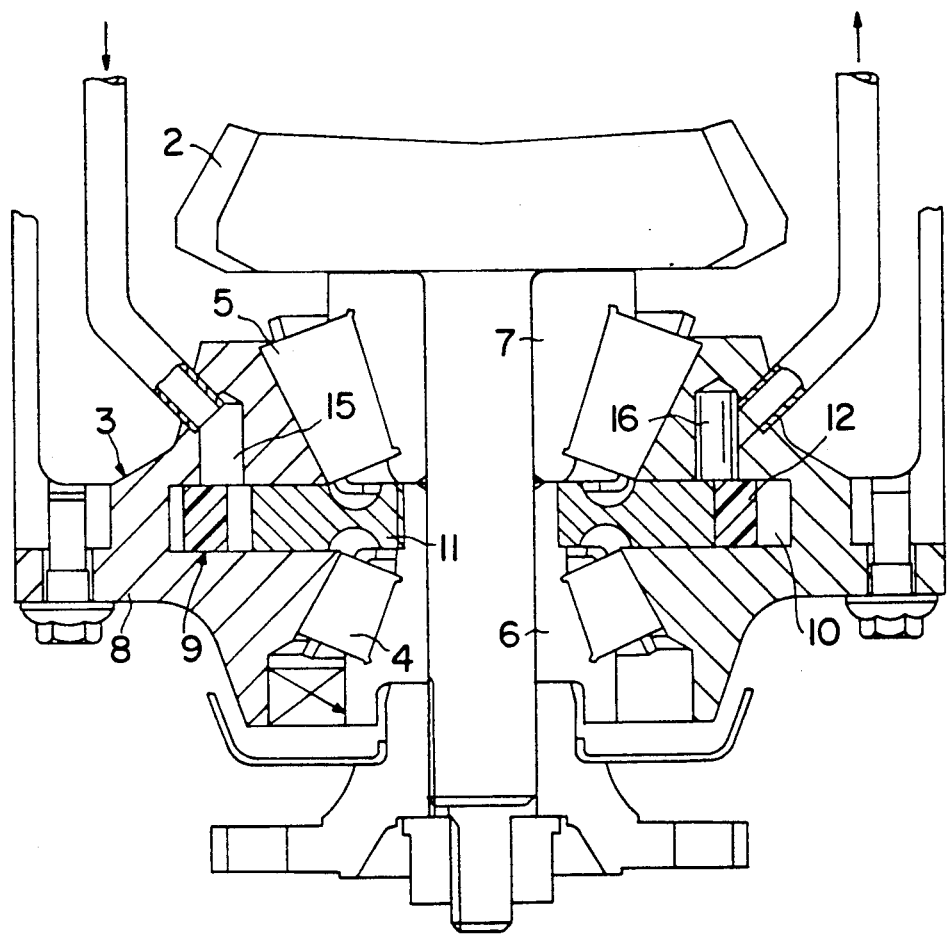
FIG. 3 is a sectional view similar to FIG. 1 showing lubricant feed lines for delivering lubricant from the pump to other locations and mechanisms.

As shown in FIG. 2, a rotor (11) attached to the inner race (6) can rotate in the pump casing (10) in the direction of the shaft indicated with an arrow. At equal intervals, four swinging vane shaped displacement elements (12) are attached to the circumference of the rotor (11), which elements urged radially outwardly by torsion springs (13) against the circumferential wall (14) of the pump casing where they form seals. Together with the rotor (11), the swinging vanes (12) divide the pump casing space, which is eccentric in relation to the rotor shaft, into four compartments which periodically increase and decrease in size as the rotor (11) rotates. At the site where the compartments increase in size, an intake valve (15) is located, and at the site where the compartments decrease in size, an outlet valve (16) has been installed. By means of lines, the lubricant can be sucked from the tank by way of an intake filter and delivered under pressure via other lines generally designated L (see FIG. 3) to points in need of lubrication. In the illustrated embodiment, the delivery or discharge line L can be connected to parts 16 in the outer ring to lubricate the rollers. If there are numerous points of lubrication, several rolling bearings according to the invention may be used, whereby each lubrication pump will supply a number of nearby lubrication points.

Obviously the invention is not limited to the embodiment described above which may be varied in may ways within the scope of the invention. For example, in a one-row roller bearing the bearing may be enlarged slightly to make it possible to install the pump casing next to the roller elements. In addition, within the scope of the invention, many types of pumps may be used.

What is claimed is:

1. The combination comprising a shaft (1) having an axis; a rolling bearing (3) having an inner race ring (6, 7) mounted on said shaft (1) and a one piece outer race ring (8), and a pair of axially spaced rows of rolling elements (4, 5) mounted between said inner (6, 7) and outer (8) race rings; and a pump (9) for lubricating said rolling bearing (3) with a lubricant, including a pump chamber (10) defined by an annular, enclosed cavity within said outer race ring (8) which opens radially inwardly eccentric to the shaft axis and includes a lubricant inlet and a lubricant outlet; a rotating member (11) concentric with said shaft (1) operable to transfer lubricant from said lubricant inlet to said lubricant outlet; a plurality of displacement elements (12) radially mounted on said rotating member (11); rotation of said rotating member (11) drawing lubricant into said enclosed cavity through said inlet, and discharging lubricant from said cavity through said outlet by the pressure differential caused by the action of displacement elements (12) within said eccentric cavity and means for delivering lubricant from the said outlet to lubricate said rolling elements.

* * * * *